United States Patent
Gicquel et al.

(10) Patent No.: US 10,747,382 B2
(45) Date of Patent: Aug. 18, 2020

(54) HIGHLY ACCURATE SYNCHRONIZED CHARGE PUMP FOR CAPACITIVE TOUCH SCREEN SYSTEM

(71) Applicant: STMicroelectronics Asia Pacific Pte Ltd, Singapore (SG)

(72) Inventors: Hugo Gicquel, Grenoble (FR); Abhishek Singh, Edinburgh (GB)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/173,267

(22) Filed: Oct. 29, 2018

(65) Prior Publication Data

US 2020/0133411 A1    Apr. 30, 2020

(51) Int. Cl.
 G06F 3/044    (2006.01)
 G06F 3/041    (2006.01)
 H02M 3/07    (2006.01)

(52) U.S. Cl.
 CPC ............ *G06F 3/044* (2013.01); *G06F 3/0412* (2013.01); *H02M 3/07* (2013.01); *G09G 2330/021* (2013.01); *G09G 2330/028* (2013.01)

(58) Field of Classification Search
 CPC ...... G06F 3/044; G06F 3/04312; H02M 3/07; G09G 2330/021; G09G 2330/028
 USPC ........................................................ 345/173
 See application file for complete search history.

(56) References Cited

U.S. PATENT DOCUMENTS

| | | |
|---|---|---|
| 7,279,959 B1 | 10/2007 | Choy |
| 2011/0025379 A1 | 2/2011 | Neto et al. |
| 2012/0127122 A1 | 5/2012 | Lim |
| 2012/0256870 A1* | 10/2012 | Klein ............... G06F 3/0416 345/174 |
| 2016/0142046 A1 | 5/2016 | Powell |
| 2017/0222602 A1* | 8/2017 | Savanth ............ H03B 5/24 |
| 2017/0302168 A1* | 10/2017 | La Rosa ............ G11C 5/145 |
| 2018/0046309 A1 | 2/2018 | Singh et al. |
| 2018/0183327 A1 | 6/2018 | Curatolo |

OTHER PUBLICATIONS

Equbal, Md. Zafar, et al: "CMOS Voltage Reference Amplifier Design with Charge-Pump Circuit," International Journal of Innovation in Science and Mathematics, vol. 3, Issue 6, ISSN (online): 2347-9051, pp. 318-322.

Schinkel, Daniel, et al.: "A Double-Tail Latch-Type Voltage Sense Amplifier with 18ps Setup+Hold Time," ISSCC 2007, Session 17, Analog Techniques and PLLs, 17.7, 2007 IEEE International Solid-State Circuits Conference (3 pages).

* cited by examiner

*Primary Examiner* — Mark Edwards
(74) *Attorney, Agent, or Firm* — Crowe & Dunlevy

(57) ABSTRACT

Disclosed herein is a touch screen controller including a driver circuit applying a drive signal to a drive line of a capacitive touch sensing panel. The driver circuit is powered by an accurate supply voltage. A driver supply circuit receives an input supply voltage and outputs the accurate supply voltage. The driver supply circuit includes a clocked comparator comparing a divided version of the accurate supply voltage to a reference voltage and outputting a comparison signal based thereupon. A voltage control circuit (e.g. a charge pump circuit) generates the accurate supply voltage in response to the comparison signal. The clocked comparator and voltage control circuit are both clocked by a driver supply circuit clock.

20 Claims, 6 Drawing Sheets

HIGHLY ACCURATE SYNCHRONIZED CHARGE PUMP FOR CAPACITIVE TOUCH SCREEN SYSTEM

TECHNICAL FIELD

This application relates to a capacitive touch screen system and, in particular, to the operation of a charge pump circuit powering driver circuits that generate drive signals for a capacitive touch screen system.

BACKGROUND

Touch screen devices are prevalent in today's computing environment. Portable computers, desktop computers, tablets, smart phones, and smartwatches typically employ a touch screen to gain user input for navigation and control of these devices. Thus, discerning the intent of the user via touch inputs is an important feature of a touch screen device.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

Two common capacitive touch sensing techniques or modes that may be performed on touch screens are mutual capacitance sensing and self capacitance sensing. In a self capacitance sensing mode, a drive signal is applied to every line, regardless of orientation. Bringing a finger or conductive stylus near the surface of the touch screen changes the local electric field, increasing the capacitance between the drive line or sense line of interest and ground (the "self capacitance") in this instance. However, since all lines are driven, the capacitance change can only be measured on a per line basis as opposed to a per capacitive node basis. Therefore, the output of self capacitance sensing is two one dimensional arrays of values, with one value for each line.

As can be appreciated, the signal to noise ratio when measuring an entire line is high, and therefore self capacitance sensing allows for precise measurements. However, a primary drawback with self capacitance sensing is an inability to resolve touches by more than a single finger accurately.

In a mutual capacitance sensing mode, a drive signal is applied to a subset of the lines referred to as drive lines, and capacitance values are measured at a subset of the lines referred to as sense lines, with it being understood that the sense lines cross the drive lines in a spaced apart fashion therefrom. Each crossing of drive line and sense line forms a capacitive node. Since bringing a finger or conductive stylus near the surface of the touch screen changes the local electric field, this causes a reduction in the capacitance between the drive lines and the sense lines (the "mutual" capacitance), and the capacitance change at every individual capacitive node can be measured to accurately determine the touch location. Therefore, the output of mutual capacitance sensing is a two-dimensional matrix of values, with one value for each capacitive node (crossing between drive line and sense line). Thus, it can be appreciated that mutual capacitance sensing allows multi-touch operation where multiple fingers or styli can be accurately tracked at the same time. For this reason, mutual capacitance sensing is widely used.

However, mutual capacitance sensing is not without its own drawbacks. For example, the signal to noise ratio when measuring a single capacitive node is low. This makes noise reduction of particular interest to mutual capacitance sensing implementations.

One way to increase decrease the signal to noise ratio is to use a charge pump to supply the drive circuit that generates the drive signal. A touch screen system 10 utilizing a charge pump in this fashion is shown in FIG. 1. The touch screen system 10 includes a touch panel 12 formed by a plurality of parallel drive lines 14 and a plurality of parallel sense lines 16. The drive lines 14 and sense lines 16 are formed of a transparent material (e.g., indium tin oxide ITO) so as to not obscure a visual display system (not shown) positioned underneath the panel 12. The drive lines 14 and sense lines 16 can each be formed of a plurality of series connected diamond shapes. The drive lines 14 extend across the panel 12 with a first orientation direction (for example, horizontal) and the sense lines extend across the panel 12 with a second orientation direction (for example, vertical) such that the lines 14 cross over the lines 16 (or vice versa). However, the plane containing the lines 14 and the plane containing the lines 16 are separated from each other by a layer of dielectric material. A sense capacitor 18 is formed at each location where the lines 14 and 16 cross.

A digital controller circuit 20 generates an alternating current (AC) drive signal (VTX) in the form of a square wave, and sequentially applies that AC drive signal to the drive lines 14 through a driver circuit 22. The AC drive signal has a frequency fd that is in the range of 100-300 kHz, for example 200 kHz.

The digital controller circuit 20 is powered from a power supply voltage Vdd, with Vdd at 3.3V. The driver circuit 22 is powered from a power supply voltage Vddh, where Vddh>Vdd, with Vddh for example at 6V, 9V, 12V, 16V, or higher as needed. A charge pump circuit 24, powered from the power supply voltage Vdd, operates to boost the Vdd voltage to produce the Vddh voltage. An oscillator circuit 26 provides an AC signal 28 to the charge pump circuit 24 to control the boost switching operation of a flyback capacitor that generates the Vddh voltage. The AC signal 28 has a frequency fo that is, for example, in the range of 10-100 MHz, for example at 48 MHz.

The driver circuit 22 includes a level shifting and buffering circuit to level shift the AC drive signal output from the digital controller circuit 20 from the Vdd voltage level to the Vddh voltage level to generate the level-shifted AC drive signal (Vdrive) for application to the drive lines 14.

A charge conversion circuit 30 such as a charge to voltage (C2V) converter circuit (or a charge to current (C2I) converter circuit) is coupled to the sense lines 16. The conversion circuit 30 senses the charge at each sense capacitor 18 and converts the sensed charge to an output signal (voltage or current) indicative of the sensed charge. The amount of charge at each sense capacitor 18 is a function of the AC drive signal, the capacitance between the drive line 14 and sense line 16 at the sense capacitor 18, and the influence of a touch capacitance contributed by the presence of an object (such as a finger or stylus) in proximity to the drive lines 14 and sense lines 16 of the panel 12. A processing circuit 32 receives the output voltages from the conversion circuit 30 for each sense capacitor 18. The output voltages are processed to determine the presence (touch and/or hover) of the object and the location of the object.

While this touch screen system 10 is somewhat effective at increasing the signal to noise ratio, it has the drawback of using the AC signal 28 (from the oscillator circuit 26) fed to the charge pump circuit 24 to control the boost switching operation of the flyback capacitor that generates the Vddh voltage which is used in generating the level shifted AC drive signal Vdrive. Since the AC signal 28 is not synchronized to the level shifted AC drive signal Vdrive, the frequency of the AC signal 28 is necessarily high so as to achieve proper regulation of the level shifted AC drive signal Vdrive, leading to increased power consumption.

Therefore, an improved design was devised. Reference is now made to FIG. 2 showing an improved configuration for a touch screen system 100. The system 100 includes a touch panel 12 formed by a plurality of parallel drive lines 14 and a plurality of parallel sense lines 16. The drive lines 14 and sense lines 16 are typically formed of a transparent material (e.g., indium tin oxide ITO) so as to not obscure a visual display system (not shown) positioned underneath the panel 12. The drive lines 14 and sense lines 16 can, for example, each be formed of a plurality of series connected diamond shapes. The drive lines 14 extend across the panel 12 with a first orientation direction (for example, horizontal) and the sense lines extend across the panel 12 with a second orientation direction (for example, vertical) such that the lines 14 cross over the lines 16 (or vice versa). However, the plane containing the lines 14 and the plane containing the lines 16 are separated from each other by a layer of dielectric material. A sense capacitor 18 is accordingly formed at each location where the lines 14 and 16 cross.

A digital controller circuit 200 generates an alternating current (AC) drive signal (VTX), for example, in the form of a square wave, and sequentially applies that AC drive signal to the drive lines 14 through a driver circuit 22. The AC drive signal has a frequency fd that is, for example, in the range of 100-300 kHz and is typically at 200 kHz.

The digital controller circuit 200 is powered from a power supply voltage Vdd, with Vdd typically at 3.3V. The driver circuit 22, however, is powered from a power supply voltage Vddh, where Vddh>Vdd, with Vddh for example at 6V, 9V, 12V, 16V, or higher as needed. A charge pump circuit 204, powered from the power supply voltage Vdd, operates to boost the Vdd voltage to produce the Vddh voltage. The digital controller circuit 200 supplies an AC control signal 208 to the charge pump circuit 204 to control the boost switching operation that generates the Vddh voltage. The AC control signal 208 has a frequency fo that is, for example, the same frequency fd as the AC drive signal. The AC control signal 208 and the AC drive signal may be phase aligned.

The driver circuit 22 includes a level shifting and buffering circuit to level shift the AC drive signal output from the digital controller circuit 200 from the Vdd voltage level to the Vddh voltage level to generate the level-shifted AC drive signal (Vdrive) for application to the drive lines 14.

A conversion circuit 30 such as a charge to voltage (C2V) converter circuit (or a charge to current (C2I) converter circuit) is coupled to the sense lines 16. The conversion circuit 30 senses the charge at each sense capacitor 18 and converts the sensed charge to an output signal (voltage or current) indicative of the sensed charge. The amount of charge at each sense capacitor 18 is a function of the AC drive signal, the capacitance between the drive line 14 and sense line 16 at the sense capacitor 18, and the influence of a touch capacitance contributed by the presence of an object (such as a finger or stylus) in proximity to the drive lines 14 and sense lines 16 of the panel 12. A processing circuit 32 receives the output voltages from the conversion circuit 30 for each sense capacitor 18. The output voltages are processed to determine the presence (touch and/or hover) of the object and the location of the object.

The touch screen system 100 is configured with the charge pump circuit 204 synchronized to the application of the AC drive signal to the drive lines 14 of the panel 12 and adaptive to different capacitive loads in different modes of operation (for example, mutual-capacitance sensing or self-capacitance sensing) of the panel 12. This results in a higher efficiency of the charge pump circuit 204 and a reduction in system noise in comparison to the FIG. 1 circuit. The principle of operation with system 100 is to take advantage of the fact that the load of the charge pump circuit 204 is not a continuously resistive load (as in FIG. 1), but is instead a sample switching capacitor load. The charge pump circuit 204 is controlled for operation at a much lower operating frequency fo (that is equal to the frequency fd of the AC drive signal) resulting in an improvement in power consumption (with an efficiency of 85-90%). Additionally, the synchronized operation of the charge pump advantageously ensures that the voltage is well settled by the time the conversion circuit 30 senses the charge at the sense capacitor 18. At all other times, accurate regulation of the voltage output from the charge pump circuit 204 is not required.

While this touch screen system 100 of FIG. 2 represents a notable improvement over the touch screen system 10 of FIG. 1, improvement may still be made. As shown in FIG. 3, overshoot is generated, which prevents the signal to noise ratio from being increased as much as is theoretically possible. Therefore, despite the advances made with the touch screen system of FIG. 2, further development is possible.

SUMMARY

Disclosed herein is a touch screen controller including a driver circuit and a driver supply circuit. The driver circuit is configured to apply a drive signal to a drive line of a capacitive touch sensing panel, and is powered by an accurate supply voltage. The driver supply circuit is configured to receive an input supply voltage and output the accurate supply voltage. The driver supply circuit includes a clocked comparator configured to compare a divided version of the accurate supply voltage to a reference voltage and to output a comparison signal based thereupon, and a voltage control circuit configured to generate the accurate supply voltage in response to the comparison signal. The clocked comparator and voltage control circuit are both clocked by a driver supply circuit clock.

The voltage control circuit may in some cases be a charge pump circuit, and in such cases, the accurate supply voltage may be a boosted supply voltage.

The driver supply circuit may include a compensation impedance coupled between the input supply voltage and ground. This compensation impedance is also coupled to the clocked comparator to provide the reference voltage to the clocked comparator.

The driver supply circuit may include a voltage divider coupled between the accurate supply voltage and ground, and the divided version of the accurate supply voltage may be produced at a tap of the voltage divider. A capacitor may be coupled between the tap of the voltage divider and ground. The clocked comparator may be a regenerative clocked comparator.

The voltage control circuit may convert the comparison signal to a continuous time signal.

Another aspect disclosed herein is a driver supply circuit for powering a driver circuit of a touch screen controller. The driver supply circuit includes a voltage control circuit and a comparator. The voltage control circuit configured to generate an accurate supply voltage from an input supply voltage, and is controlled via a comparison signal. The comparator is configured to compare a divided version of the accurate supply voltage to a reference voltage and to output the comparison signal based thereupon. Operation of the voltage control circuit and clocked comparator is synchronized.

The voltage control circuit may in some cases be a charge pump circuit.

The driver supply circuit may include a compensation impedance coupled between the input supply voltage and ground. The compensation impedance may also be coupled to the comparator to provide the reference voltage to the comparator.

The driver supply circuit may also include a voltage divider coupled between the accurate supply voltage and ground, and the divided version of the accurate supply voltage may be produced at a tap of the voltage divider.

A capacitor may be coupled between the tap of the voltage divider and ground.

The driver supply circuit may include a clock signal node, and the comparator may include a clocked comparator having a clock input coupled to the clock signal node. The voltage control circuit may have a clock input coupled to the clock signal node. The operation of the voltage control circuit and clocked comparator may be synchronized to an edge of a clock signal received from the clock signal node.

The comparator may be a regenerative clocked comparator.

The voltage control circuit may convert the comparison signal to a continuous time signal.

Another aspect disclosed herein is a circuit including a clocked comparator having a clock input receiving a clock signal, a non-inverting input, and an inverting input. A charge pump circuit is powered by an input supply voltage and outputting a boosted supply voltage, the charge pump circuit being clocked by the clock signal. A voltage divider is coupled between the boosted supply voltage and ground. The inverting input of the clocked comparator is coupled to a tap of the voltage divider. An impedance circuit is coupled between the input supply voltage and ground. The non-inverting input of the clocked comparator is coupled to a tap of the impedance circuit The impedance circuit may include first and second resistors coupled in parallel between the input supply voltage and the tap of the impedance circuit, and a capacitor coupled between the tap of the impedance circuit and ground.

The voltage divider may include first and second resistors coupled between the boosted supply voltage and ground. A tap between the first and second resistors may be the tap of the voltage divider. A capacitor may be coupled between the tap between the first and second resistors and ground.

A method aspect is included as well. The method includes powering a driver circuit with an accurate supply voltage, applying a generated by the driver circuit to a drive line of a capacitive touch sensing panel, and changing an input supply voltage to the accurate supply voltage. The changing is performed by in response to an edge of a driver supply circuit clock, comparing a divider version of the accurate supply voltage to a reference voltage and outputting a comparison signal based thereupon, and in response to the edge of the driver supply circuit clock, generating the accurate supply voltage in response to the comparison signal.

BRIEF DESCRIPTION OF THE DRAWINGS

For a better understanding of the embodiments, reference will now be made by way of example only to the accompanying figures in which.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 4:
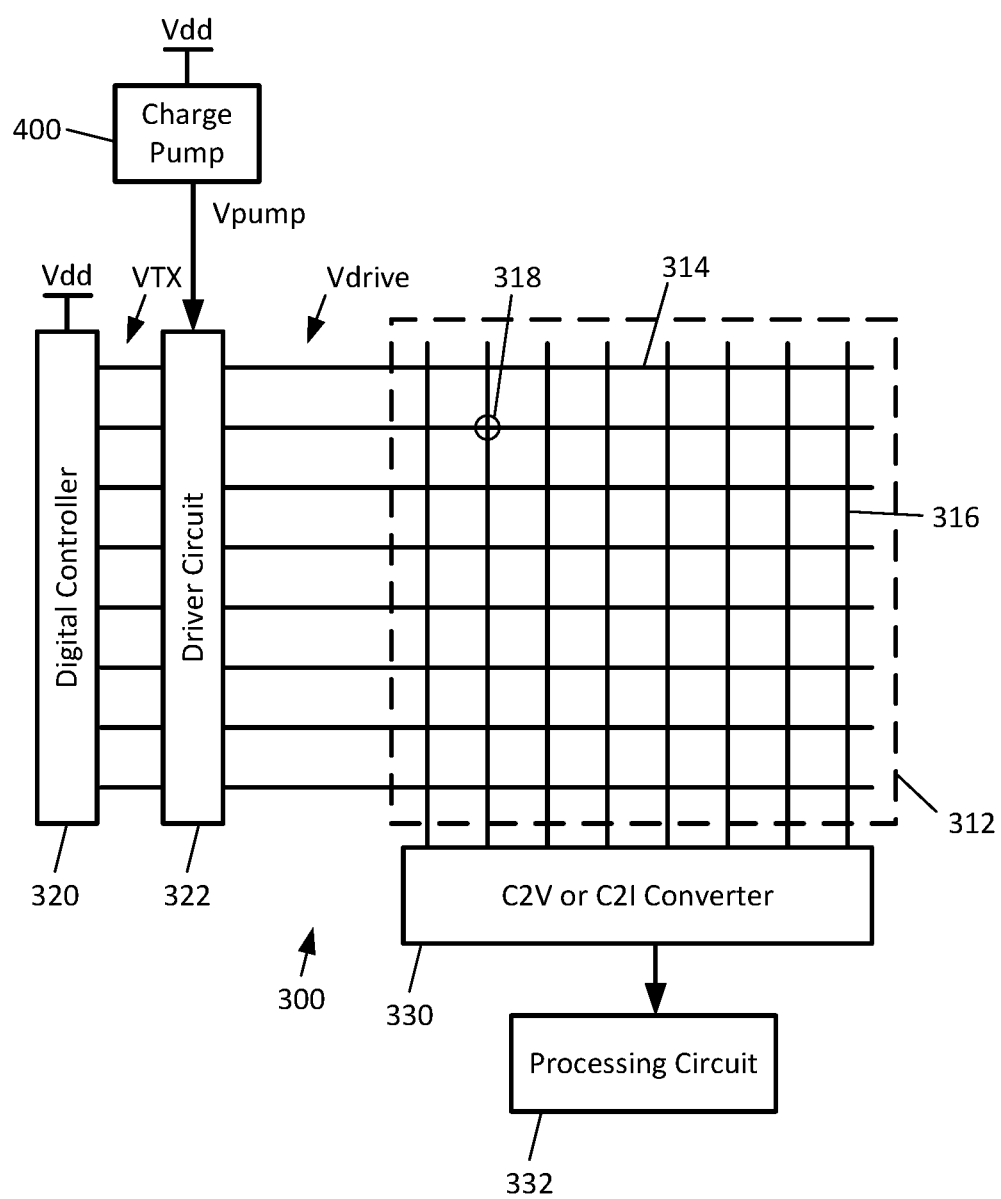
FIG. 4 shows a configuration for a touch screen system disclosed herein configured for operation in mutual-capacitance mode.

A touch screen system that addresses the limitations of the systems described above is now taught in detail with reference to the touch screen system 300 of FIG. 4. The touch screen system 300 includes a touch panel 312 formed by a plurality of parallel drive lines 314 and a plurality of parallel sense lines 316 intersecting the drive lines 314. The drive lines 314 and sense lines 316 are formed of a transparent material (e.g. indium tin oxide ITO) so as to not obscure a display layer (not shown) positioned underneath the touch panel 312. The drive lines 314 and sense lines 316 can each be formed of a plurality of series connected diamond shapes. The drive lines 314 extend across the panel 312 with a first orientation direction (e.g., horizontal) and the sense lines extend across the panel 312 with a second orientation direction (e.g., vertical) such that the lines 314 cross over the lines 316 or vice versa. However, the plane containing the lines 314 and the plane containing the lines 316 are separated from each other by a layer of dielectric material. A sense capacitor 318 (which can also be referred to as a touch sensor) is formed at each location where the lines 314 and 316 cross.

A digital controller circuit 320 generates an alternating current (AC) drive signal (VTX), for example, in the form of a square wave, and sequentially applies that AC drive signal VTX to the drive lines 314 through a driver circuit 322. The AC drive signal VTX has a frequency fd that is, for example, in the range of 100-300 kHz and is typically at 200 kHz.

The digital controller circuit 320 is powered from a power supply voltage Vdd, with Vdd at 3.3V in this example. The driver circuit 322, however, is powered from a power supply voltage Vpump, where Vpump>Vdd, with Vpump for example at 6V, 9V, 12V, 16V or higher as needed. A charge pump circuit 400, powered from the power supply voltage Vdd, operates to boost the Vdd voltage to produce the Vpump voltage.

The driver circuit 322 includes a level shifting and buffering circuit to level shift the AC drive signal output from the digital controller circuit 320 from the Vdd voltage level to the Vpump voltage level to generate the level-shifted AC drive signal (Vdrive) for application to the drive lines 314.

A conversion circuit 330 such as a charge to voltage (C2V) converter circuit (or a charge to current (C2I) converter circuit) is coupled to the sense lines 316. The conversion circuit 330 senses the charge at each sense capacitor 318 and converts the sensed charge to an output signal (voltage or current) indicative of the sensed charge. The amount of charge at each sense capacitor 318 is a function of the AC drive signal, the capacitance between the drive line 314 and sense line 316 at the sense capacitor 318 and the influence of a touch capacitance contributed by the presence of an object (such as a finger or stylus) in proximity to the drive lines 314 and sense lines 316 of the panel 312. A processing circuit 332 receives the output voltages from the conversion circuit 330 for each sense capacitor 318. The output voltages are processed to determine the presence (touch and/or hover) of the object and the location of the object.

Figure 5:
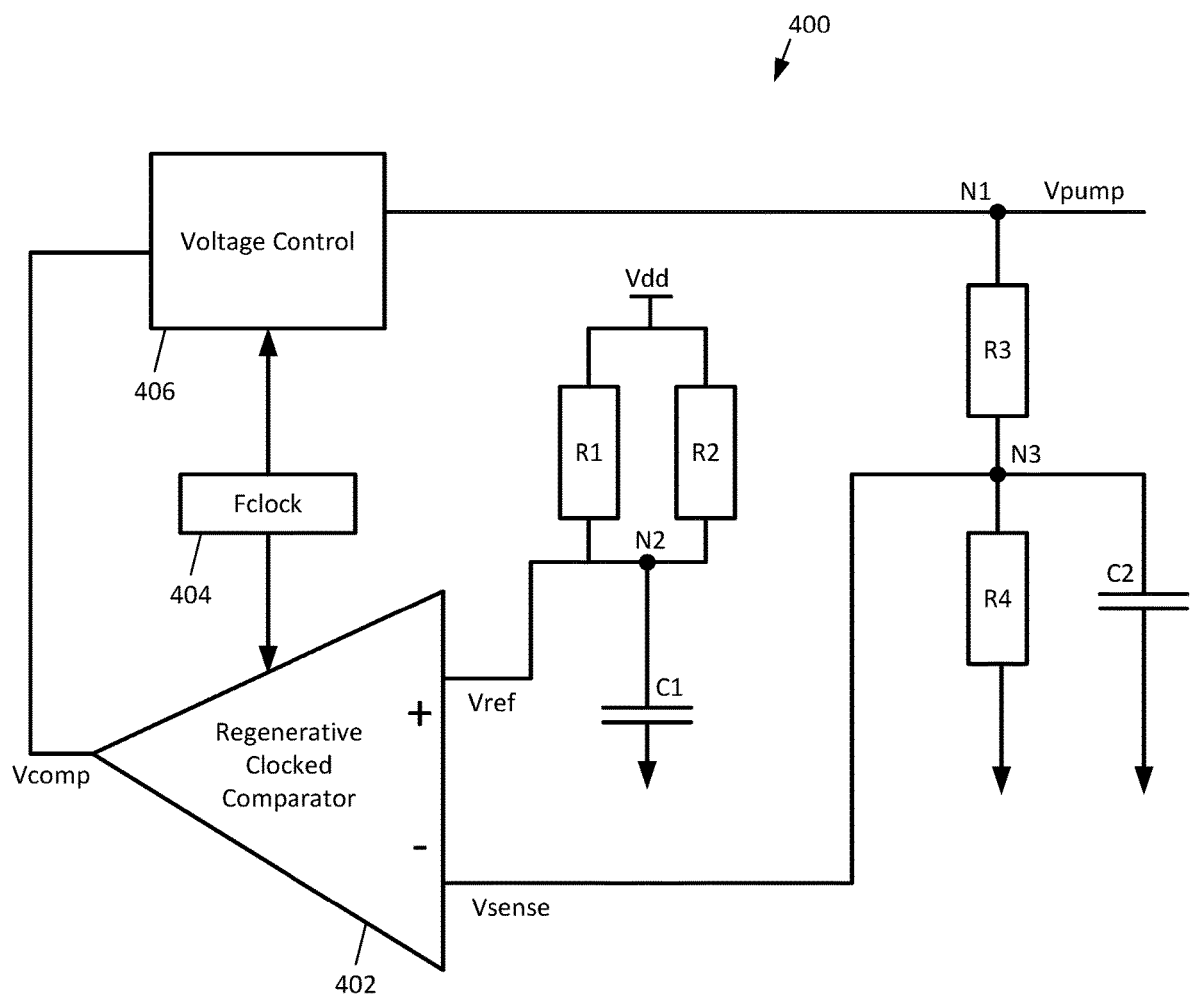
FIG. 5 is a schematic block diagram of the charge pump of FIG. 4.

The charge pump circuit 400 is now described with additional reference to FIG. 5. The charge pump circuit 400 includes a regenerative clocked comparator 402 having a non-inverting input coupled to node N2 to receive a reference voltage Vref and an inverting input coupled to node N3 to receive a sense voltage Vsense. Resistances R1 and R2 are coupled in parallel between Vdd and node N2, and capacitor C1 is coupled between node N2 and ground. Resistances R3 and R4 are coupled in series between node N1 and ground, with node N3 being the center tap between resistances R3 and R4. Capacitor C2 is coupled between node N3 and ground.

The regenerative clocked comparator 402 generates a comparison voltage Vcomp as a function of a comparison between Vref and Vsense. Voltage control circuitry 406 (e.g., a charge pump) generates the charge pump voltage Vpump at node N1 based upon the received comparison signal Vcomp.

Note that the regenerative clocked comparator 402 and voltage control circuitry 406 are both clocked by the clock signal Fclock received from the clock generator 404. Details of one regenerative clocked comparator 402 that may be used can be found in the reference "A Double Tail Latch-Type Voltage Sense Amplifier with 18 ps Setup+Hold Time", D. Schinkel et al., IEEE IS CC Conference, 2007, the contents of which are hereby incorporated in their entirety—it should, however, be understood that other clocked comparators may be used instead of the clocked comparator described in this reference.

Therefore, at each rising edge of the clock signal Fclock, Vsense (which itself is a voltage divided version of Vpump as sensed at the center tap N3) is compared with Vref. If Vsense is less than Vref, Vcomp is generated as a logic high. Conversely, if Vsense is greater than Vref, Vcomp is generated as a logic low. Therefore, at each receipt of Vcomp as a logic high from the regenerative clocked comparator 402 at a rising edge of the clock signal Fclock, the voltage control circuitry 406 pumps its output up by ΔV. Once Vsense is greater than Vref, the regenerative clocked comparator 402 outputs a logic low as Vcomp at the next rising edge of the clock signal Fclock, and the voltage control circuitry 406 then maintains Vpump at its present level. This can be seen in FIG. 6, where during each pump period ΔT, the voltage of Vpump is increased by ΔV.

Figure 1:
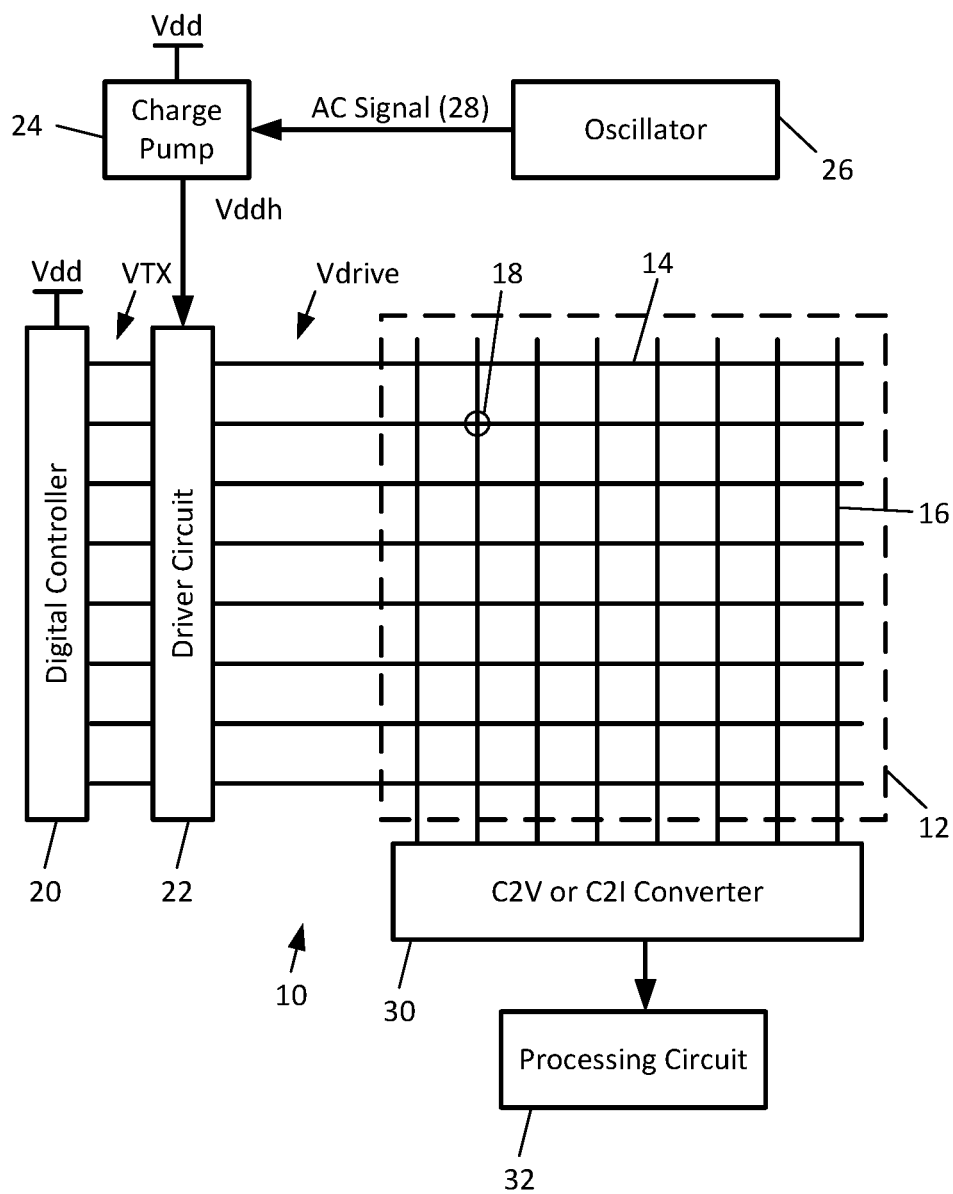
FIG. 1 shows a conventional configuration for a touch screen system.
Figure 2:
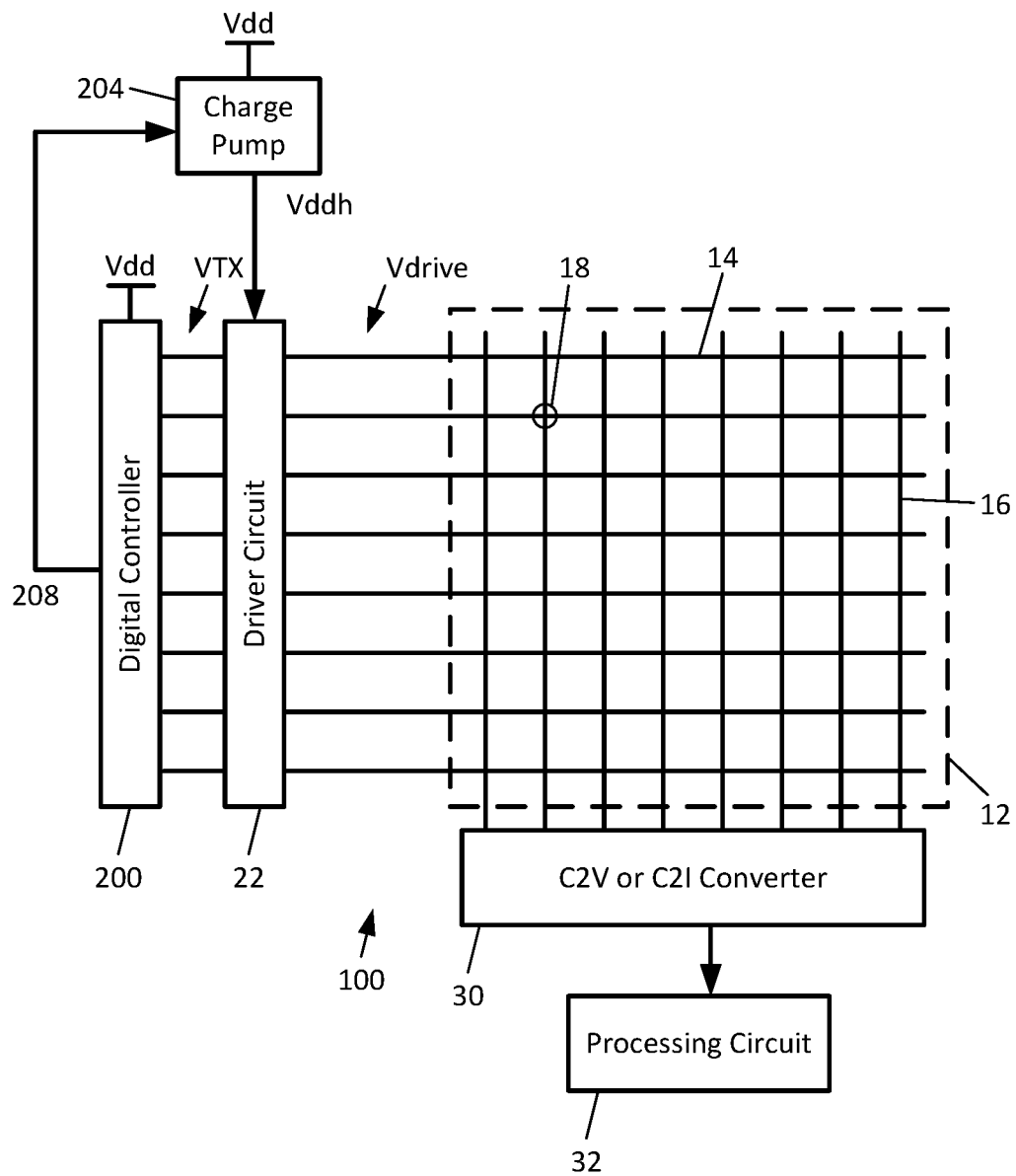
FIG. 2 shows an improved prior art configuration for a touch screen system configured for operation in mutual-capacitance mode with a synchronized charge pump.
Figure 3:
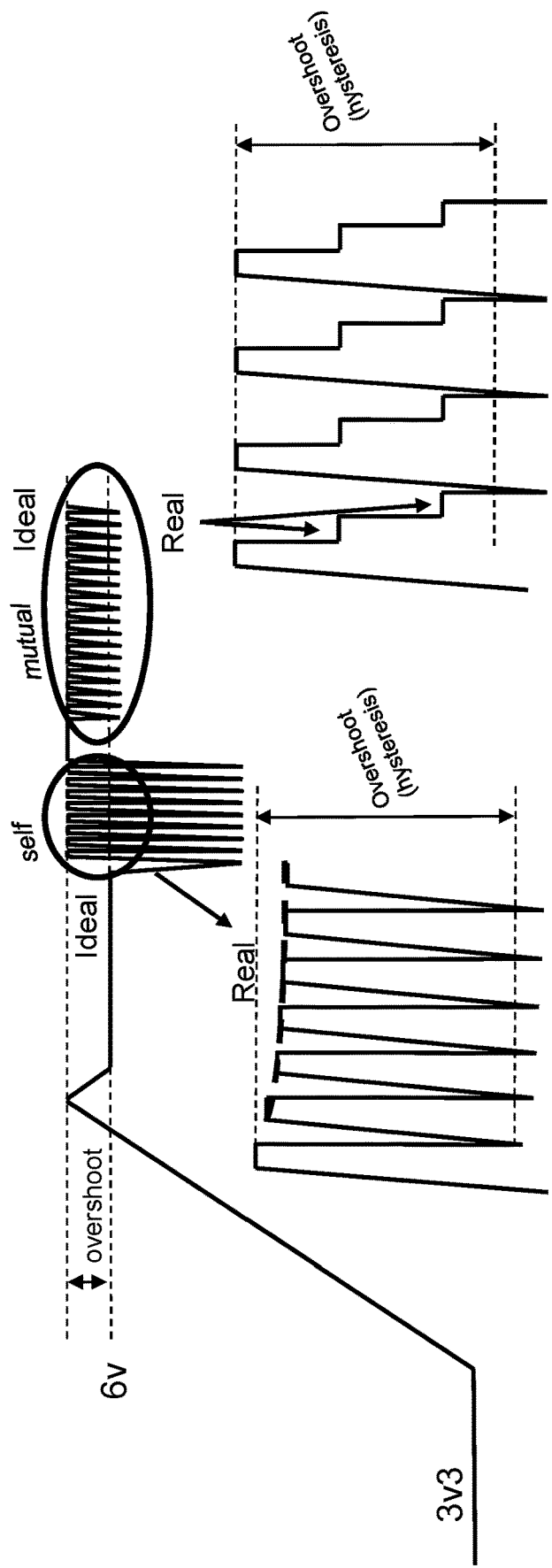
FIG. 3 is a graph showing overshoot in the generation of the level shifted AC drive signal of FIG. 2.
Figure 6:
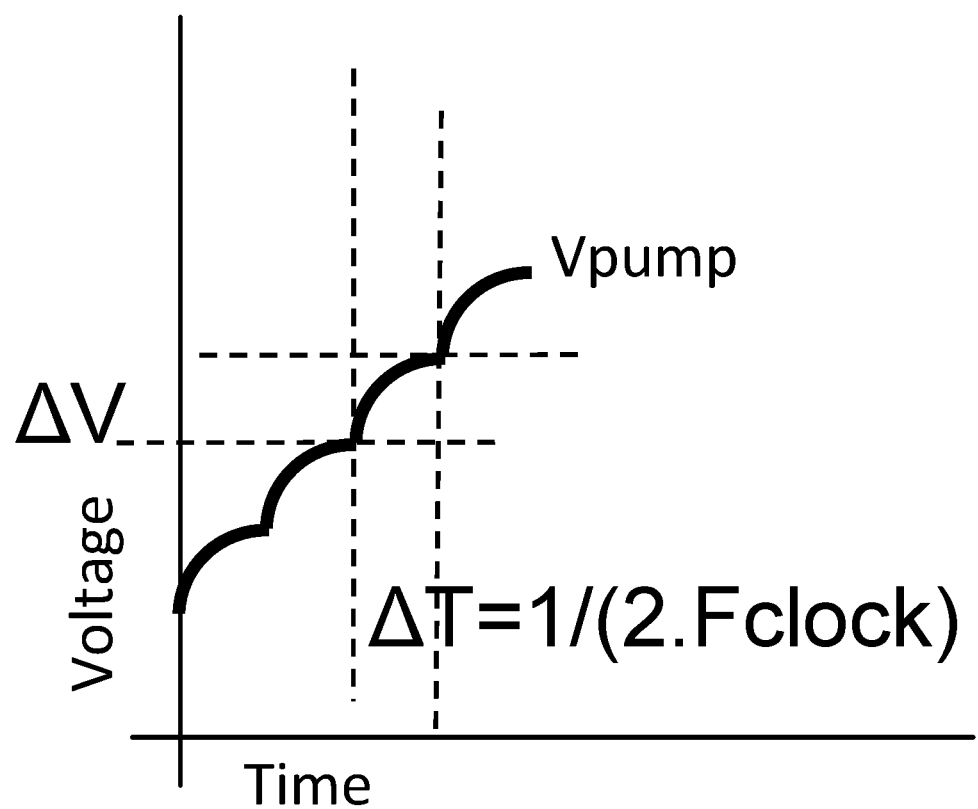
FIG. 6 is a graph showing output voltage of the charge pump of FIG. 5 over time.

The fact that the regenerative clocked comparator 402 and voltage control circuitry 406 are synchronized with the charge pump clock Fclock provides for less delay in producing Vpump at the desired level while reducing power consumed in the level shifting of Vdd to Vpump. Thus, as seen in FIG. 6, each pump period is but 1/(2*Fclock). In addition, since the regenerative clocked comparator 402 is clocked and does not provide its output in continuous time, the overshoot present with the prior art design shown in FIG. 3 is not present. Moreover, this design of the touch screen system causes much lesser electromagnetic interference (EMI) than prior designs.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A touch screen controller, comprising:
   a driver circuit configured to apply a drive signal to a drive line of a capacitive touch sensing panel, the driver circuit being powered by an accurate supply voltage; and
   a driver supply circuit configured to receive an input supply voltage and output the accurate supply voltage, the driver supply circuit comprising:
      a clocked comparator configured to compare a divided version of the accurate supply voltage to a reference voltage and to output a comparison signal based thereupon, in response to the clocked comparator receiving a signal edge of a driver supply circuit clock; and
      a voltage control circuit configured to generate the accurate supply voltage in response to the comparison signal, in response to the voltage control circuit receiving the signal edge of the driver supply circuit clock.

2. The touch screen controller of claim 1, wherein the voltage control circuit comprises a charge pump circuit; and wherein the accurate supply voltage comprises a boosted supply voltage.

3. The touch screen controller of claim 1, wherein the driver supply circuit further comprises a compensation impedance coupled between the input supply voltage and ground, and wherein the compensation impedance is coupled to the clocked comparator to provide the reference voltage to the clocked comparator.

4. The touch screen controller of claim 1, wherein the driver supply circuit further comprises a voltage divider coupled between the accurate supply voltage and ground, and wherein the divided version of the accurate supply voltage is produced at a tap of the voltage divider.

5. The touch screen controller of claim 4, further comprising a capacitor coupled between the tap of the voltage divider and ground.

6. The touch screen controller of claim 1, wherein the clocked comparator comprises a regenerative clocked comparator.

7. The touch screen controller of claim 1, wherein the voltage control circuit converts the comparison signal to a continuous time signal.

8. A driver supply circuit for powering a driver circuit of a touch screen controller, the driver supply circuit, comprising:

a voltage control circuit configured to generate an accurate supply voltage from an input supply voltage in response to the voltage control circuit receiving a signal edge of a clock signal, the voltage control circuit being controlled via a comparison signal; and a comparator configured to compare a divided version of the accurate supply voltage to a reference voltage and to output the comparison signal based thereupon, in response to the comparator receiving the signal edge of the clock signal.

9. The driver supply circuit of claim 8, wherein the voltage control circuit comprises a charge pump circuit.

10. The driver supply circuit of claim 8, wherein the driver supply circuit further comprises a compensation impedance coupled between the input supply voltage and ground, and wherein the compensation impedance is coupled to the comparator to provide the reference voltage to the comparator.

11. The driver supply circuit of claim 8, wherein the driver supply circuit further comprises a voltage divider coupled between the accurate supply voltage and ground, and wherein the divided version of the accurate supply voltage is produced at a tap of the voltage divider.

12. The driver supply circuit of claim 11, further comprising a capacitor coupled between the tap of the voltage divider and ground.

13. The driver supply circuit of claim 8, further comprising a clock signal node; wherein the comparator comprises a clocked comparator having a clock input coupled to the clock signal node; wherein the voltage control circuit has a clock input coupled to the clock signal node; and wherein the operation of the voltage control circuit and clocked comparator are synchronized to an edge of a clock signal received from the clock signal node.

14. The driver supply circuit of claim 8, wherein the comparator comprises a regenerative clocked comparator.

15. The driver supply circuit of claim 8, wherein the voltage control circuit converts the comparison signal to a continuous time signal.

16. A circuit, comprising:
a clocked comparator having a clock input directly electrically receiving a clock signal, a non-inverting input, and an inverting input;
a charge pump circuit powered by an input supply voltage and outputting a boosted supply voltage, the charge pump circuit having a clock input directly electrically receiving the clock signal;
a voltage divider coupled between the boosted supply voltage and ground;
wherein the inverting input of the clocked comparator is coupled to a tap of the voltage divider; and
an impedance circuit coupled between the input supply voltage and ground;
wherein the non-inverting input of the clocked comparator is coupled to a tap of the impedance circuit.

17. The circuit of claim 16, wherein the impedance circuit comprises:
first and second resistors coupled in parallel between the input supply voltage and the tap of the impedance circuit; and
a capacitor coupled between the tap of the impedance circuit and ground.

18. The circuit of claim 17, wherein the voltage divider comprises:
first and second resistors coupled between the boosted supply voltage and ground, wherein a tap between the first and second resistors is the tap of the voltage divider; and
a capacitor coupled between the tap between the first and second resistors and ground.

19. A method, comprising:
powering a driver circuit with an accurate supply voltage;
applying a voltage generated by the driver circuit to a drive line of a capacitive touch sensing panel; and
changing an input supply voltage to the accurate supply voltage by:
in response to a comparator receiving an edge of a driver supply circuit clock, comparing a divided version of the accurate supply voltage to a reference voltage and outputting a comparison signal based thereupon; and
in response to a voltage control circuit receiving the edge of the driver supply circuit clock, generating the accurate supply voltage in response to the comparison signal.

20. The touch screen controller of claim 1, further comprising a clock generator configured to generate the driver supply circuit clock, wherein the clock generator is directly electrically connected to both the clock comparator and to the voltage control circuit.

* * * * *

UNITED STATES PATENT AND TRADEMARK OFFICE
CERTIFICATE OF CORRECTION

PATENT NO. : 10,747,382 B2
APPLICATION NO. : 16/173267
DATED : August 18, 2020
INVENTOR(S) : Hugo Gicquel et al.

Page 1 of 1

It is certified that error appears in the above-identified patent and that said Letters Patent is hereby corrected as shown below:

In the Specification

At Column 2, Line 6, please delete the word "decrease".

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*